Aug. 5, 1958     R. W. HOFFMANN     2,846,378
ELECTRODE AND ITS MANUFACTURE
Filed Feb. 7, 1956

INVENTOR.
Roger W. Hoffmann.
ECKHOFF & SLICK
         ATTORNEYS
BY Robert N. Eckhoff.
A MEMBER OF THE FIRM

United States Patent Office 2,846,378
Patented Aug. 5, 1958

2,846,378

ELECTRODE AND ITS MANUFACTURE

Roger W. Hoffmann, West Los Angeles, Calif., assignor to American Potash & Chemical Corporation (Nevada), a corporation of Nevada Application February 7, 1956, Serial No. 563,882

7 Claims. (Cl. 204—12)

This invention relates to a new electrode and particularly to the preparation of a massive lead dioxide plate electrode.

A lead dioxide electrode can be used as an insoluble anode in numerous aqueous electrolytic baths as a substitute for the expensive, hard-to-get platinum anode. As an example, the electrolytic production of sodium perchlorate, an intermediate in the chemical production of ammonium perchlorate and potassium perchlorate, requires an anode material of extreme chemical inertness and high oxygen over-voltage. At present, platinum, in the form of thin perforated sheets, is the anode material used in the commercial electrolytic production of sodium perchlorate. Because of expense and lack of readily available platinum, unlimited production of perchlorates is at present restricted. With a relatively inexpensive, readily produced lead dioxide plate electrode, an almost unlimited production of perchlorates is possible.

Lead dioxide plate electrodes can be used as anodes in other aqueous electrolytic processes to produce products such as permanganates, persulfates and the like.

Experiments have been performed which show that lead dioxide is a satisfactory material to use as an anode in an electrolytic cell for the production of sodium perchlorate.

It is an object of the present invention to provide an improved process for the manufacture of an electrode of lead dioxide.

Another object of the present invention is to provide a novel form of lead dioxide electrode.

As stated, lead dioxide electrodes are commonly used in the electrolysis of various complex electrolytes of a corrosive nature. The conditions under which they are used are extremely corrosive and it is therefore necessary to have an electrode which is of uniform composition, adequate strength and size to resist adequately the conditions of use.

Figures 1, 2, 3:
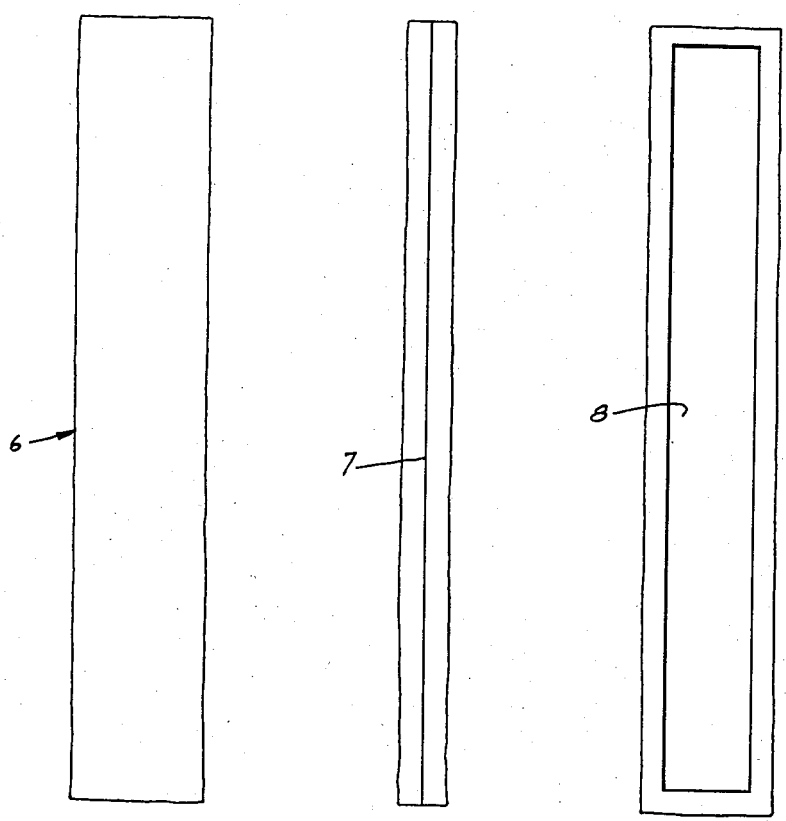

I have found that a lead dioxide electrode can be formed by electrolysis on a metal base of a desired shape and size from a lead nitrate bath if the metal base is first lightly coated with a deposit of lead dioxide from a bath containing a solution of a lead salt of a water soluble organic acid such as acetic acid, citric acid, versenic acid, gluconic acid or tartaric acid. The coating is applied in an alkaline solution. When the coating on the base plate of the lead dioxide is achieved a second coating of lead dioxide is thereafter applied to the sheet by utilizing the previously coated metal plate as the anode in a lead nitrate bath. The plating of lead dioxide on the coated metal base is continued until the desired size is attained. The structure can be used as such but, preferably, it is split into two halves and the metal base removed. For example, referring to the accompanying drawing, Figure 1 is a plan view of a composite lead dioxide electrode structure formed upon a suitable metal plate base. Figure 2 is a side elevation of the composite electrode structure shown in Figure 1.

Figure 4:
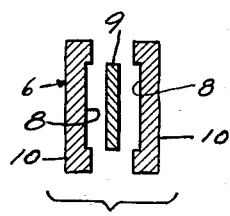

Figure 3 is a plan view of half the electrode structure shown in Figures 1 and 2 with the metal plate removed, while Figure 4 is a sectional view showing the two halves separated from the plate.

Referring to the drawings, I have indicated the composite electrode structure at 6, the metal plate 9 being completely enclosed and covered by the lead dioxide layers 10. When it is desired to remove the metal plate, the structure is severed along the parting line, as indicated at 7, into two substantially like halves (Figure 4) and the metal plate removed. In Figure 3, for example, the rectangular area, indicated at 8, corresponds in outline to that of the metal plate as it appears on a face of a parted half. Each half is useful as an electrode as such. Suitable holes are drilled for attachment of electrical connections and a stop-off lacquer can be applied to any selected area of the electrode to prevent its corrosion by the atmosphere above the electrolyte.

In the following examples, I have set forth in further detail the manufacture of a specific electrode structure. If an electrode becomes cracked or broken, it can be repaired and made whole by securing the pieces together temporarily so they are in a tight fit and then depositing additional lead dioxide on the electrode. A build-up occurs in the area defining the break or crack which seals the parts together.

*Example 1.*—A nickel sheet measuring 0.072" thick x 4" wide x 30" long was used as the anode conductor. The surface was prepared by cleaning and degreasing with ethylene dichloride. It was then hand buffed vertically and horizontally by rubbing with No. 1/0 emery cloth until the surface of the nickel was roughened considerably. After this, it was again cleaned and degreased in a solution of ethylene dichloride.

An electrolytic cell was set up employing the clean nickel sheet as the anode with 23" of its length in solution. Two graphite sheets each measuring 3/16" x 3.5" x 27" with 23" of length in solution were used as the cathodes. The spacing of the anode surface to the cathode surfaces was 1.5". The electrolyte used was made up as follows:

| | G./l. |
|---|---|
| Sodium potassium tartrate | 50 |
| Sodium hydroxide | 25 |
| Lead oxide | 48 |

A deposit of lead dioxide was plated on the nickel sheet anode conductor with cell operating conditions as follows:

| | |
|---|---|
| Cell temperature | 64 to 68° C. |
| Applied current | 1.3 amps. |
| Cell voltage | 1.15 volts. |
| Anode current density | 1.0 amp./sq. ft. |
| Cathode current density | 0.55 amp./sq. ft. |
| Length of run | 2 hours. |

The deposit of lead dioxide on the nickel sheet after removal from the electrolyte was thoroughly rinsed in distilled water to remove all of the alkaline electrolyte clinging to it. It was then air dried to complete dryness. The thickness of the lead dioxide deposit formed in the lead tartrate electrolyte was about ½ mil. Prior to using this plated anode sheet in a lead nitrate electrolyte cell and to provide corrosion of that part of the nickel sheet which would be exposed to the nitrate bath and the vapor space above the liquid level in the cell, the following protective measures were taken:

(1) Rustbond No. 6 (Carboline Co.) was painted over 2" of the upper end of the tartrate lead dioxide layer and about an additional 3" above this toward the top of the anode conductor. This coating was force air dried for thirty minutes with the air temperature at about 140° F.

(2) Three coats of Miccro HR 302 (Michigan Chrome and Chemical Co.) stop-off lacquer were then applied over the primer, allowing about thirty minutes drying time between coats and one hour drying time after the final coat. These coats were force air dried with an air temperature of about 140° F.

This anode conductor sheet, coated with a thin layer of lead dioxide from the alkaline lead tartrate bath, was then used as the anode in a lead nitrate cell. The effective depth in solution was 21" with an immersed surface area of 1.185 sq. ft. Two graphite sheets each measuring 3/16" x 3.5" x 27" with 22" of length in solution were used as the cathodes. The effective cathode surface area in solution was 2.25 sq. ft. The distance between the outside surfaces of the anode and the cathodes was 1.5". A picture frame type baffle constructed of Plexiglas was used to house the nickel-lead dioxide anode conductor sheet. The baffle actually covered all of the edges of the conductor sheet and overlapped it about 1/8" in from the edges. It had been found that a baffle prevented trees and nodules of lead dioxide from forming at and around the anode edges; it is also an aid in holding the anode vertically in the exact center between the two cathodes.

Prior to plating in the lead nitrate cell, the conductor sheet set in its Plexiglas frame was preheated in a distilled water bath at 85° C. and then rapidly dried with a stream of compressed air. It was then immediately placed in the lead nitrate bath which had been previously brought up to a temperature of about 90° C. Electrical connections were then made, with a Lincoln SAE 400 Shield Arc Welder furnishing the D. C. power.

The cell electrolyte and feed solutions had the following composition:

|  | G./l. |
|---|---|
| $Pb(NO_3)_2$ | 200 |
| NaF | 0.5 |
| $Cu(NO_3)_2 \cdot 3H_2O$ | 7.5 |
| $Ni(NO_3)_2 \cdot 6H_2O$ | 12.5 |
| Igepal CO-880 | 0.75 |
| $HNO_3$ | less than 1.0 |

The cell operating conditions were as follows:

| | |
|---|---|
| Cell temperature | 90±1° C. |
| Applied current | 59.2 amps. |
| Cell voltage | 2.9 to 2.3 volts. |
| Anode current density | 50 amp./sq. ft. |
| Cathode current density | 26.2 amp./sq. ft. |
| $Pb(NO_3)_2$ | Controlled at about 200 g./l. |
| NaF | Controlled at about 0.5 g./l. |
| $HNO_3$ | Controlled at about 10 g./l. |
| $Cu(NO_3)_2 \cdot 3H_2O$ | Controlled at about 7.5 g./l. |

During the run, the feed solution was automatically and continuously fed to the cell at the rate of about 200 to 400 ml. per minute with an average feed rate of 245 ml. per minute to control the nitric acid and lead nitrate concentrations. Total duration of the run was 26 hours. The current efficiency achieved for the run was 76%.

Upon removal of the anode from the cell, it was allowed to air cool. It was then removed from the Plexiglas frame and weighed. Each half side of the lead dioxide plate was then stripped from the nickel base sheet. Stripping of the lead dioxide was accomplished by initially parting the lead dioxide plate along one edge with a small sharp edged chisel and then following the line of partition with a spatula. One-half plate stripped as a whole section; the other half broke into two sections, one sheet 5" long, the other about 16" long. The whole half measured approximately 1/4" x 4" x 21". The broken half was of the same thickness. Both halves were hard and strong and resonated with a ringing sound when struck sharply with a small metallic object.

To strengthen further these halves and to weld the broken half together, two additional runs were made. The whole half plate was used as the anode in a lead nitrate bath, again using graphite cathodes, and was plated under operating conditions identical to those described previously. Prior to the additional plating, the lead dioxide plate was coated with stop-off lacquer at that portion which was to be at the liquid level and in the vapor space to protect it from any possible corrosion. The usual method of application for the stop-off lacquer was used. A pressure type electrical connection at the top of the base lead dioxide electrode employing two thin silver strips was used to connect the original lead dioxide plate to the positive connection of the D. C. source. This whole half lead dioxide electrode was plated for an additional 8 hours to a thickness of about 3/8". The side of the lead dioxide electrode which was originally on the nickel base sheet was smooth and even, the other side was quite modular. These nodules were removed by grinding on a surface grinder with a soft wheel.

In a similar manner, the broken halves of the other side of the original lead dioxide electrode were placed together and additional lead dioxide plated on the entire section. Merely a pressure connection was made between the two broken sections and they were held in place and together in the Plexiglas frame housing with the use of Plexiglas shims. Total plating time of the run was 22 hours and a total thickness of better than 3/8" was achieved and a strong, whole electrode was produced. The electrical connection used in this run was made by drilling three 3/16" diameter holes through the lead dioxide plate with a diamond point and bolting on thin silver strips, which were in turn connected to the positive connection of the D. C. source. This run shows that broken sections of a lead dioxide plate electrode can be repaired and made one again. Current efficiencies obtained for these last two runs were of the order of 80%.

*Example II.*—Although the run described was operated originally for a total of only 26 hours at an anode current density of 50 amp./sq. ft., several other successful runs have been made for a total of up to 42 hours at an anode current density of 50 amp./sq. ft. Lead dioxide plate thickness of each stripped half was 3/8". The resulting electrodes were hard and strong; by operating in this manner, the necessity of continued plating separately on each half plate is eliminated.

There are at least three advantages derived from the plating of a very thin film of lead dioxide from an alkaline bath of a suitable organic acid: (1) The thin film of lead dioxide plated from the alkaline bath protects the base metal sheet from corrosion when it is placed in the acid bath; (2) lead dioxide can be deposited in plate form from a lead nitrate bath on a base metal sheet at relatively high anode current density; and (3) the completed lead dioxide electrode half plates can be readily stripped from the base metal sheet.

This feature of easy strippability is highly important because it allows the production of strong, massive electrodes consisting solely of lead dioxide. The literature reports many attempts to use lead dioxide plated on various metals in which the entire composite electrode was used as an anode in electrolytic cells for the production of sodium perchlorate. In these cases, the anodes eventually failed because the corrosive chlorate-perchlorate solution sooner or later came into contact with the metal substrate and corroded it away. This weakened the structure of the lead dioxide sufficiently, causing it to collapse. In addition, the solution became contaminated with corrosion products from the metal substrate. When the lead dioxide is stripped from the base metal, there is no metal remaining to corrode and so disrupt the anode or contaminate the solution.

Other methods are reported in the literature such as plating on substrates of graphite mixed with paraffin wax followed by melting off the wax or plating on only one side of a metal cylinder followed by deliberately dissolving away the metal. The method of this invention, whereby the lead dioxide is readily stripped mechanically from the substrate following which the substrate may be reused, has obvious advantages.

After stripping of the lead dioxide half plates, the nickel sheet may be cleaned by buffing or by chemical treatment, rinsing in distilled water, drying, and then replating in the lead tartrate bath and reused in the lead nitrate bath. The only limiting factor as to how many times the original nickel base sheet can be used in such a cycle is the amount of total corrosion suffered in the acid lead nitrate bath. I have used a single nickel base sheet twice and after its second stripping, the nickel surface still appeared in fairly good condition.

Other base metal anode conductors which can be used in place of nickel in this process are stainless steel, mild steel, cobalt, or any alloy of these metals. A lead dioxide layer has been plated successfully on mild steel sheet and stainless steel sheet from an alkaline bath. Similarly, it is possible to use base sheets of graphite or platinum. Plating an initial coating of lead dioxide from an alkaline lead tartrate bath prior to plating in a lead nitrate bath is not required to prevent corrosion of the graphite or platinum; however, to obtain easy stripping of the lead dioxide electrode half plates from the metal plate may make this desirable. Complete and successful stripping of the lead dioxide half plates would be required in the case of platinum so that the platinum sheet may be used over repeatedly in producing additional lead dioxide electrodes. In the case of graphite, complete stripping of the lead dioxide plate is also desirable because of the deterioration of the graphite during subsequent use as an anode in a sodium perchlorate production cell.

As a substitute for the tartrate lead dioxide bath, one can use baths made with either lead acetate, lead citrate, lead versenate, a lead salt of ethylene diamine tetra acetic acid, or lead gluconate. It is also possible to use lead perchlorate or lead sulfamate electrolytes as substitutes for the lead nitrate electrolyte.

It should be noted that a non-ionic surfactant, e. g., Igepal CO–880 (nonyl phenoxy polyoxyethylene ethanol) (Antara Chemicals, Division of General Aniline & Film Corp.) was used as a crystallization modifier in the lead nitrate bath. U. S. P. grade gelatine has been used successfully for this same purpose. However, it should be noted that gelatine sometimes contains organic contaminants which are detrimental to the production of strong lead dioxide electrodes. As possible substitutes for Igepal CO–880, several other very similar non-ionic surfactants are available from other manufacturers, among them, Carbide and Carbon Chemicals Co. (Tergitol NP Series), and Rohm and Haas Co. (part of the Triton Series).

I claim:

1. A method of manufacture of a lead dioxide electrode comprising depositing electrolytically on a conducting plate a coating of lead dioxide from an alkaline bath containing a solution of a lead salt of water soluble organic acid and then depositing electrolytically on said coated plate a second coating of lead dioxide from an acid bath.

2. A method of manufacture of a lead dioxide electrode comprising depositing electrolytically on a conducting plate a light coating of lead dioxide from an alkaline bath containing a solution of a lead salt of a water soluble organic acid, then depositing electrolytically on said coated plate a second coating of lead dioxide from an acid bath until the plate is encased in a coating of lead dioxide, and splitting the coating on the plate to provide two substantially like halves.

3. A method of manufacture of a lead dioxide electrode comprising depositing electrolytically on a conducting plate a light coating of lead dioxide from an alkaline bath containing a solution of a lead salt of a water soluble organic acid, then depositing electrolytically on said coated plate, a second coating of lead dioxide from an acid bath until the plate is encased in a coating of lead dioxide, splitting the coating on the plate to provide two substantially like halves, and coating at least one of said halves with additional lead dioxide from an acid bath of a lead salt.

4. A process as in claim 1 wherein the water soluble organic acid is selected from the group consisting of acetic acid, citric acid, tartaric acid and gluconic acid and the acid bath is one selected from the group consisting of lead nitrate, lead perchlorate and lead sulfamate.

5. A process as in claim 2 wherein the water soluble organic acid is selected from the group consisting of acetic acid, citric acid, tartaric acid and gluconic acid and the acid bath is one selected from the group consisting of lead nitrate, lead perchlorate and lead sulfamate.

6. A process as in claim 3 wherein the water soluble organic acid is selected from the group consisting of acetic acid, citric acid, tartaric acid and gluconic acid and the acid bath is one selected from the group consisting of lead nitrate, lead perchlorate and lead sulfamate.

7. An anode for use with corrosive electrolytes consisting of a metal having electrolytically deposited thereon a layer of lead dioxide from a bath containing a solution of a lead salt of a water-soluble organic acid, said lead dioxide being electrolytically deposited from an alkaline solution of said salt; said lead dioxide coated base having thereon an exterior deposit of lead dioxide, said exterior deposit of lead dioxide having been electrolytically deposited from an acid bath of a lead salt selected from the group consisting of lead perchlorate, lead sulfamate and lead nitrate.

References Cited in the file of this patent

FOREIGN PATENTS

| | | |
|---|---|---|
| 24,806 | Great Britain | of 1906 |
| 371,245 | France | Jan. 17, 1907 |
| 194,340 | Great Britain | Mar. 12, 1923 |

UNITED STATES PATENT OFFICE
CERTIFICATE OF CORRECTION

Patent No. 2,846,378                                    August 5, 1958

Roger W. Hoffmann

It is hereby certified that error appears in the above numbered patent requiring correction and that the said Letters Patent should appear as corrected below.

In the grant, lines 2 and 3, for "assignor to American Potash & Chemical Corporation (Nevada), a corporation of Nevada," read -- assignor to American Potash & Chemical Corporation, a corporation of Delaware, --; lines 12 and 13, for "American Potash & Chemical Corporation (Nevada), its successors" read -- American Potash & Chemical Corporation, its successors --; in the heading to the printed specification, lines 3 to 5, for "assignor to American Potash & Chemical Corporation (Nevada), a corporation of Nevada" read -- assignor to American Potash & Chemical Corporation, a corporation of Delaware --.

Signed a sealed this 4th day of November 1958.

(SEAL)
Attest:
KARL H. AXLINE

Attesting Officer

ROBERT C. WATSON
Commissioner of Patents